United States Patent [19]

Kaneda et al.

[11] Patent Number: 5,060,207
[45] Date of Patent: Oct. 22, 1991

[54] MAGNETO-OPTICAL RECORDING/REPRODUCING APPARATUS

[75] Inventors: Tokuya Kaneda; Chikazu Yokoi, both of Odawara, Japan

[73] Assignee: Hitachi, Ltd., Tokyo, Japan

[21] Appl. No.: 428,507

[22] Filed: Oct. 27, 1989

[30] Foreign Application Priority Data

Oct. 28, 1988 [JP] Japan .................... 63-270932

[51] Int. Cl.⁵ .................. G11B 21/02; G11B 21/12
[52] U.S. Cl. ............................ 369/13; 369/75.2; 369/77.1; 369/77.2; 360/114
[58] Field of Search .................. 369/13, 75.2, 77.1, 369/77.2, 292; 360/99.05, 99.06, 114

[56] References Cited

U.S. PATENT DOCUMENTS

| | | | |
|---|---|---|---|
| 4,272,795 | 6/1981 | Davis, Jr. ................. | 360/99.05 |
| 4,674,079 | 6/1987 | Agostini .................. | 369/77.1 |
| 4,727,444 | 2/1988 | Fukushima ............... | 369/75.2 |
| 4,740,937 | 4/1988 | Watanbe .................. | 369/13 |
| 4,796,241 | 1/1989 | Hayakawa ................ | 360/114 |
| 4,807,068 | 2/1989 | Shiraishi .................. | 360/99.06 |
| 4,811,137 | 3/1989 | Muto ....................... | 360/99.06 |
| 4,829,502 | 5/1989 | Aoyagi .................... | 369/77.1 |
| 4,831,477 | 5/1989 | Sakamoto ................. | 360/99.06 |
| 4,837,758 | 6/1989 | Motoyama ................ | 369/13 |
| 4,964,005 | 10/1990 | Uzuki ...................... | 369/77.2 |

FOREIGN PATENT DOCUMENTS

| | | | |
|---|---|---|---|
| 0066451 | 3/1987 | Japan ....................... | 360/114 |
| 0055704 | 3/1988 | Japan ....................... | 368/114 |
| 2192750 | 1/1988 | United Kingdom ....... | 369/13 |

Primary Examiner—Stuart S. Levy
Assistant Examiner—John C. Pokotylo
Attorney, Agent, or Firm—Kenyon & Kenyon

[57] ABSTRACT

A magneto-optical recording/reproducing apparatus includes a frame, a cartridge containing therein a magneto-optical recording disk, an optical head for applying an optical beam on the recording disk, an electromagnet for applying a bias magnetic field on the recording disk, a cartridge holder for holding therein the cartridge, a mechanism for reciprocating the cartridge holder between an insertion position and a loading position in which a recording, a reproducing and an erasing operations are carried out, a turn table for rotating the recording disk on the loading position, and a driving mechanism. The driving mechanism drives the electromagnet close to the recording disk when it is to be in the loading position and away from the recording disk when it is to be in the insertion position in opposite directions perpendicular to a plane of the recording disk in accordance with movement of the cartridge holder. The driving mechanism is disposed on the cartridge holder and the electromagnet is so disposed as to interpose the recording disk between the optical head and the electromagnet.

14 Claims, 4 Drawing Sheets

FIG. IA

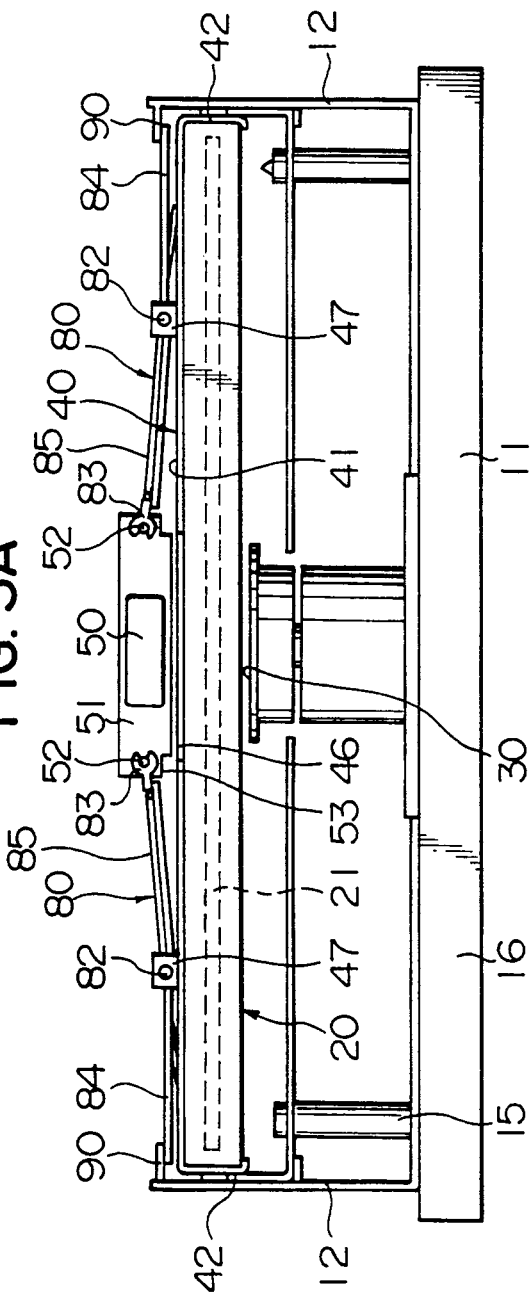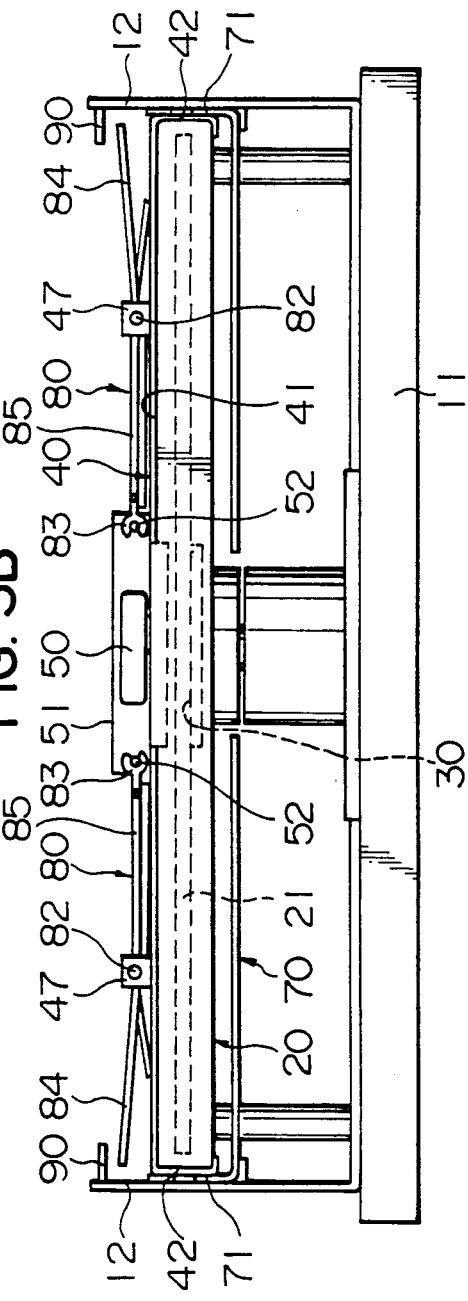

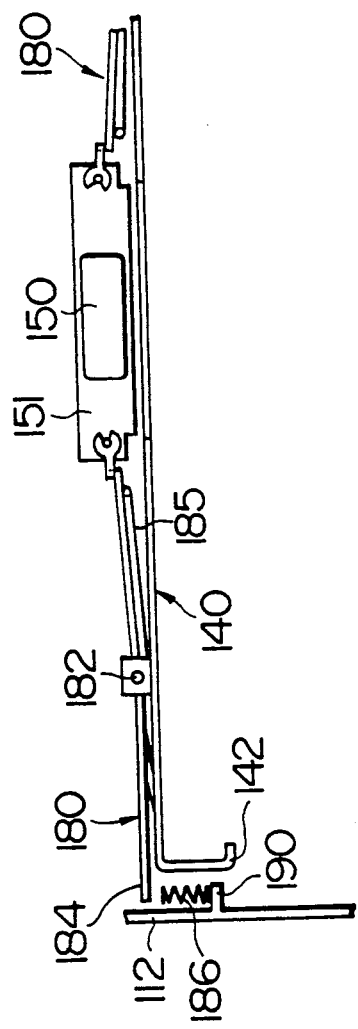

ic recording/reproducing apparatus. In particular, it relates to a magneto-optical recording/reproducing apparatus which comprises an apparatus for applying a bias magnetic field to a recording medium during recording and erasing operations, and a mechanism for making the bias magnetic field applying apparatus close to and apart from the recording medium.

MAGNETO-OPTICAL RECORDING/REPRODUCING APPARATUS

BACKGROUND OF THE INVENTION

The present invention relates to a magneto-optical recording/reproducing apparatus. In particular, it relates to a magneto-optical recording/reproducing apparatus which comprises an apparatus for applying a bias magnetic field to a recording medium during recording and erasing operations, and a mechanism for making the bias magnetic field applying apparatus close to and apart from the recording medium.

Recently, an optical disk apparatus which uses an optical disk as a recording medium is available for a recording/reproducing apparatus of large capacity. The apparatus is widely used for electronic storage or filing. However, in general, it is impossible to rewrite information written on the optical disk. In contrast, a magneto-optical recording/reproducing apparatus is an optical disk apparatus which can rewrite and erase the information. The magneto-optical recording/reproducing apparatus uses the magneto-optical effect.

As disclosed in various publications, information recording using the magneto-optical effect is conducted by the following procedures.

First, a recording medium is provided, which includes a substrate, and a perpendicularly magnetized magnetic film on the substrate. An optical beam, e.g. a laser beam, is focussed in to a 1.5 μm diameter spot and irradiates that perpendicularly magnetized magnetic field film of the recording medium. Accordingly, the film temperature rises locally to a level in which the perpendicularly magnetized magnetic field film loses its ferromagnetic properties, i.e., to the Curie temperature. Simultaneously, a bias magnetic field is applied to a part of the perpendicular magnetic film, a temperature of which rises, to reverse the direction of magnetization thereof. The bias magnetic field applying apparatus may be a permanent magnet or an electromagnet. In order to carry out a stable recording, it is required to obtain a desired intensity of bias magnetic field by means of making the bias magnetic field applying apparatus as close to the recording medium as possible.

On the other hand, to protect the recording medium, e.g. the optical disk, and to facilitate handling thereof, the recording medium is usually enveloped by a specific casing or a cartridge.

Further, the recording/reproducing apparatus necessarily equipped with a cartridge carrying mechanism for mounting the cartridge, envelopping therein the recording medium, into the recording/reproducing apparatus and for moving the cartridge into a loading position in which the recording and reproducing operations can be carried out.

Therefore, the recording/reproducing apparatus necessitates a mechanism for making the bias magnetic field applying apparatus close to and apart from the recording medium. Namely, in case that the cartridge is to be inserted into the recording/reproducing apparatus and to be loaded into a predetermined loading position, the bias magnetic field applying apparatus is required to be apart from the recording medium so as to prevent the bias magnetic field applying apparatus from blocking off an insert passage of the cartridge. To the contrary, in case that the recording medium is loaded into the predetermined loading position, the bias magnetic field applying apparatus is required to be sufficiently close to the recording medium.

To this end, a recording/reproducing apparatus disclosed in JP-A-60-251541 is provided with a pivotable member, an end portion of which the bias magnetic field applying apparatus is attached, in addition to the cartridge carrying mechanism. The pivotable member is linked with a pivotable clamping member for clamping the recording medium onto a turn table so that it swings to make the bias magnetic field applying apparatus close to and apart from the recording medium.

In a recording/reproducing apparatus disclosed in JP-U-62-202601, upon an insertion of the cartridge, the bias magnetic field applying apparatus is abutted by the cartridge and is drawn back against a spring.

The recording/reproducing apparatus according to JP-A-60-251541 necessitates a separate pivotable member in addition to the cartridge carrying mechanism and places a pivot of the pivotable member away from the recording medium. Therefore, on the operation of the pivotable members, an arc stroke thereof is enlarged to make the recording/reproducing apparatus large.

In the recording/reproducing apparatus disclosed in JP-U-62-202601, since an edge of the cartridge necessarily abuts with the bias magnetic field applying apparatus every time the cartridge is inserted into the recording/reproducing apparatus, an impact load would be applied to the bias magnetic field applying apparatus. Accordingly the cartridge may be damaged seriously making it hard to obtain long term high reliability, and smooth insertion into the apparatus.

SUMMARY OF THE INVENTION

The present invention provides a mechanism for making the bias magnetic field applying apparatus close to and apart from the recording medium that is simple and small, thereby providing a recording/reproducing apparatus of reduced overall dimensions.

The present invention also provides a recording/reproducing apparatus which can make the bias magnetic field applying apparatus close to and apart from the recording medium without any damage on the cartridge.

To this end, in the magneto-optical recording/reproducing apparatus according to the present invention, the bias magnetic field applying apparatus is moved close to and apart from the recording medium in opposite directions perpendicular to a plane of the recording medium in response to the movement of the cartridge holder.

Other objects, features and advantages of the present invention will be apparent from the following description of the preferred embodiments described in connection with the accompanying drawings.

BRIEF DESCRIPTION OF THE DRAWINGS

FIG. 1A is an enlarged fragmentary sectional view of a part of the apparatus designated by A in FIG. 1.

FIGS. 3A and 3B are side views seen from the line III—III in FIG. 1 showing an insert position of the cartridge and a loading position thereof, respectively.

FIG. 4 is a fragmentary side view showing a magneto-optical recording/reproducing apparatus according to another embodiment of the present invention.

DETAILED DESCRIPTION

Figure 1:
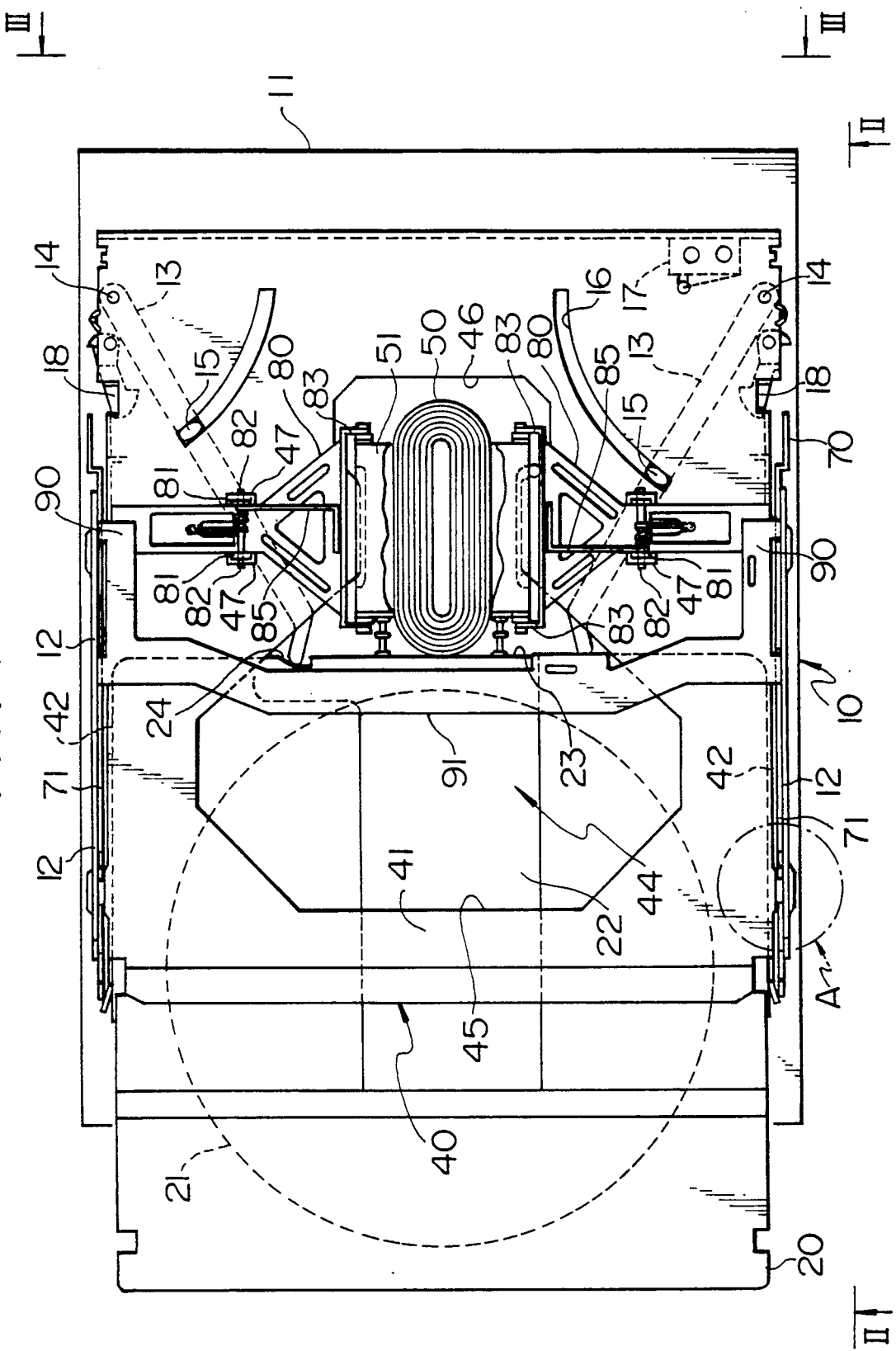
FIG. 1 is a plan view showing a magneto-optical recording/reproducing apparatus according to one embodiment of the present invention.
Figure 2:
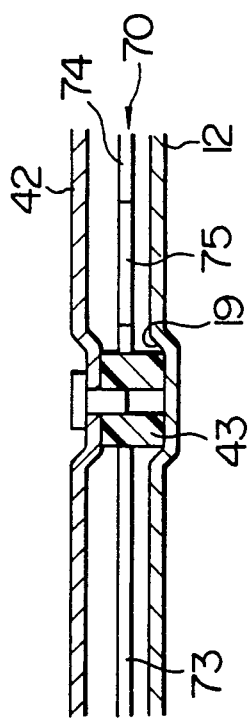
FIG. 2 is a front view seen along line II—II in FIG. 1.
Figure 2:
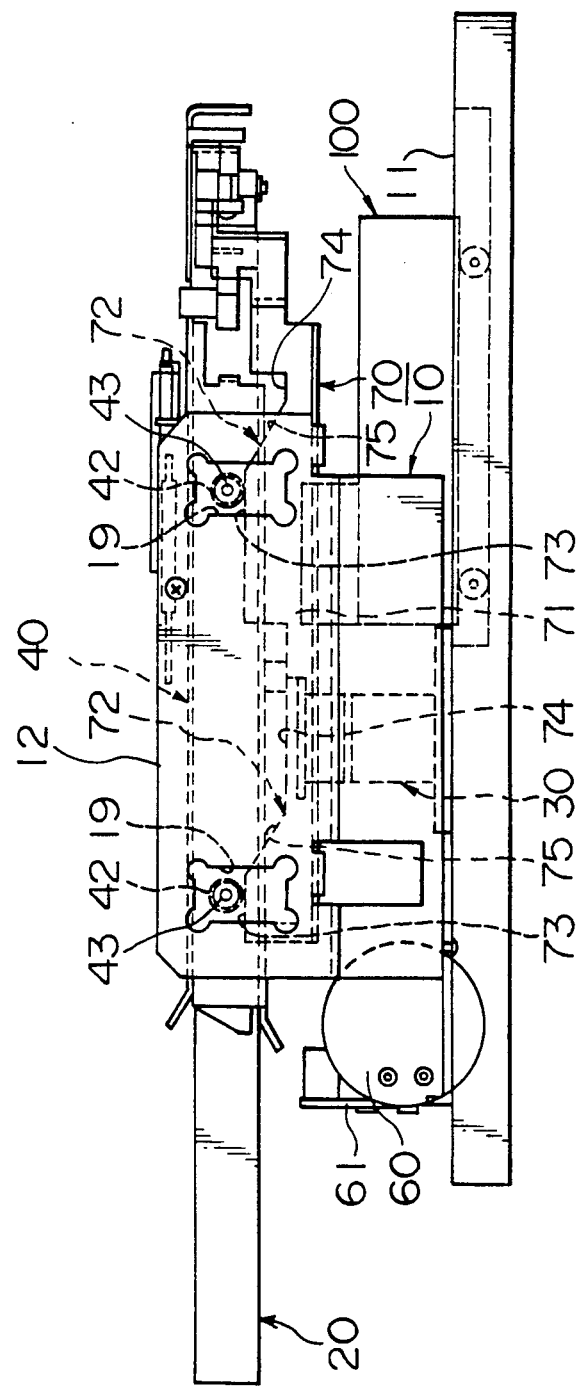

Referring to FIGS. 1 and 2, a magneto-optical recording/reproducing apparatus according to one embodiment of the present invention includes a frame 10 having a base 11 and a pair of spaced stationary side walls 12, 12 extending upright from the base 11, a cartridge 20 provided with a shutter 22 for exposing an optical disk 21 which is encapsulated as a magneto-optical recording medium by the cartridge 20, a turn table 30 for turning the optical disk 21, and an optical head system 100 for irradiating a laser beam onto the optical disk 21. The apparatus further includes a cartridge holder 40 between the stationary walls 12, 12 for holding the cartridge 20, a mechanism for reciprocating the cartridge holder 40 between an insert position and a loading position, and an elliptically wound electromagnet coil 50 by which a bias magnetic field is applied onto a part of the optical disk 21 irradiated by the laser beam to invert a direction of magnetization in such part, to thereby rewrite or erase the information stored thereon.

An operation of the apparatus will be explained hereinunder with reference to FIGS. 1 and 2.

The cartridge 20 encapsulating therein the optical disk 21 is inserted into the cartridge holder 40 which is provided with a member 41 and a pair of spaced side walls 42, 42 extending upright from opposite side ends of the member 41. Then, the cartridge 20 abuts at two points of a leading edge 23 thereof on shutter arms 13, 13, one point of which is notch 24 formed in the leading edge 23. After the cartridge 20 is further pressed into the apparatus, the shutter arms 13 and 13 pivot upon the respective pivots 14 to come close to each other. The pivotal movement of the shutter arms 13 are guided by an engagement between a guide pins 15 formed on the shutter arms 13 and an arc guide slits 16 formed on the member 41 (or the cartridge holder 40). The shutter 22 is then opened by the pivotal movement of the shutter arms 13. After the cartridge 20 is pressed into a predetermined position in the apparatus, the cartridge 20 is detected by a switch 17 and simultaneously held by latches 18, 18. Upon detecting of the cartridge 20 by means of the switch 17, a loading motor 60 operates. Through a reduction gear 61, the rotation of the motor 60 is transmitted to an ejector 70 so as to reciprocate it linearly. The ejector 70 includes a pair of side plates 71, 71 connected with each other, each of which plates is disposed between the side wall 42 of the cartridge holder 40 and the side wall 12 of the frame 10 (FIG. 1A). Each of the side plates 71 of the ejector 70 is provided at two portions thereof with oblique recesses 72, 72. The cartridge holder 40 is normally urged towards the frame base 11 by means of a spring (not shown).

Each of the side walls 42 of the cartridge holder 40 is provided with two guide rollers 43, 43 rotatably extending outwards beyond the side plate 71 of the ejector 70. Upon the insertion of the cartridge 20, the guide rollers 43 abut or rest upon an edge 73 of the side plate 71 of the ejector 70 so as to maintain the cartridge holder 40 in the insert position. In case that the ejector 70 is moved leftward by the loading motor 60 in the drawings, while the guide roller 43 rotates along a inclined portion 75 of the recess 72 in the side plate 71 in the ejector 70, it is guided by a guide concavity 19 formed in the side wall 12 to move downward to a loading position. Namely, the cartridge 20 descends. A position in which the guide roller 43 abuts against a bottom 74 of the recess 72 is the loading position of the cartridge 20. In this position, the optical disk 21 is rotatably set on the turn table 30. In case that the cartridge 20 is to be discharged, the ejector 70 is moved rightward by the loading motor 60. According this, the guide roller 43 is moved upwards to the insert position along the inclined portion 75 of the recess 72 and the edge of the guide concavity 19, thereby enabling to discharge the cartridge 20.

Referring to FIGS. 1, 3A and 3B, the member 41 of the cartridge holder 40 is provided with an opening means 44 consisting of a larger octagonal opening 45 and a rectangular access opening 46 connected to the opening 45. The access opening 46 is so shaped and placed that it can over a recording/reproducing area of the optical disk 21 fully. The electromagnet coil 50 is disposed above the access opening 46. The electromagnet coil 50 is held by a retainer 51. The electromagnet coil 50 is movable in opposite directions perpendicular to a plane of the optical disk 21, and is so arranged that it goes apart from the cartridge 20 on the insertion or ejection of the cartridge while it comes to close to the cartridge 20 on the loading of the cartridge.

In order to move the electromagnet coil 50, a pair of levers 80, 80 of Y-shape are provided above the cartridge holder 40 (FIG. 1). The lever 80 is made of a metal sheet by punching it out, and is bent at a longitudinal middle portion thereof to become dihedral. The lever 80 is provided at the longitudinal middle portion thereof with a pair of upright portions 81, 81. The cartridge holder 40 is also integrally provided at the member 41 thereof with a pair of upright portions 47, 47. A pivot 82 is provided to extend through the upright portions 47 and 81, so that the lever 80 is pivotable on the pivot 82.

Two finger ends 83, 83 of each of the levers 80 is pivotally mounted on the respective bars 52, 52 projecting from the retainer 51. A pair of stoppers 90, 90 is provided integrally with a connecting member 91 for side walls 12 and 12. On insertion of the cartridge (FIG. 3A), since the cartridge 20 is apart from the turn table 30, the other end 84 of the lever 80 abuts against the stopper 90 to raise the electromagnet coil 50. According, the cartridge 20 can be inserted smoothly into the cartridge holder 40 since the passage of the cartridge 20 isn't blocked off by the magnetic coil retainer 51. Once the cartridge holder 40 is moved to the loading position (FIG. 3B), the other end 84 of the lever 80 is disengaged from the stopper 90 and then the electromagnet coil 50 is moved downward to come close to the optical disk 21 through the access opening 46 due to the force of gravity acting thereon. The downward movement of the electromagnet coil 50 is interrupted by abutting of a shoulder portion 53 formed in the magnetic coil retainer 51 against the periphery of the access opening 46 to keep a space between the electromagnet coil 50 and the optical disk 21 a predetermined value with high precision. In this embodiment, in order to make the electromagnetic coil 50 come close to the optical disk 21 surely regardless of the setting attitude of the apparatus, even if gravity doesn't affect the movement of the electromagnet coil close to the optical disk, a spring 85 is provided in the lever 80 to always urge the coil retainer 51 towards the turn table 30.

FIG. 4 shows another embodiment which includes two kinds of springs, 185 and 186, instead of the single kind of spring. The general constitution thereof is substantially identical to that of the first embodiment shown in FIG. 1 except for the spring. One spring, 185, is disposed to urge a lever 180 to lift the coil retainer 151 upward, thereby keeping it apart from the optical disk on the insertion position as shown in the drawings. The other spring, 186, has a spring constant which is larger than that of the spring 185. The spring 186 is disposed between a stopper 190 provided integrally with the side wall 112 of the frame 10 and the other end 184 of a lever 180. On the loading position, e.g. in case that the cartridge holder descends, the spring 186 overcomes the spring force of the spring 185 to lift up the other end 184 of the lever 180, thereby making the coil retainer 151 (or the electromagnetic coil 150) close to the optical disk.

What is claimed is:

1. A magneto-optical recording/reproducing apparatus comprising:
   a frame;
   a cartridge containing a magneto-optical recording medium;
   means for applying an optical beam on a surface of said recording medium;
   means for applying a bias magnetic field on said recording medium, said bias magnetic field applying means being so disposed that said recording medium is positioned between said optical beam applying means and said bias magnetic field applying means;
   means for holding said cartridge;
   means for reciprocating said holding means between an insertion position and a loading position in which a recording operation, a reproducing operation and an erasing operation are carried out;
   means for moving said recording medium into said loading position; and
   means for driving said bias magnetic field applying means close to said recording medium when it is to be in said loading position and away from said recording medium when it is to be in said insertion position, said means for driving moving said bias magnetic field applying means in opposite directions perpendicular to a plane of a face of said recording medium, said means for driving being disposed on said means for holding and being driven by a driving power due to reciprocative movement of said means for holding.

2. An apparatus according to claim 1, wherein said means for holding includes an access port portion into which said bias magnetic field applying means is to be entered to be close to said recording medium, and said bias magnetic field applying means including a periphery portion having a dimension larger than that of said access port portion, thereby restricting the movement of said bias magnetic field applying means toward said recording medium to maintain a distance between said recording medium and said bias magnetic field applying means when said recording medium is in the loading position.

3. An apparatus according to claim 1, wherein said frame includes a stationary part, and wherein said reciprocating means drives said holding means into said insertion position to make it close to said stationary part and into said loading position to make it apart from said stationary part, and wherein said driving means cooperates with said stationary part to restrict the movement of said bias magnetic field applying means toward said recording medium in said insertion position, said driving means disengaging with said stationary part to allow the movement of said bias magnetic field applying means toward said recording medium on said loading position.

4. An apparatus according to claim 3, wherein said driving means further includes an elastic member which urges said bias magnetic field applying means towards said recording medium.

5. An apparatus according to claim 3, wherein said driving means includes an arm, a first end portion of which swingably carries said bias magnetic field applying means, and a fulcrum stationary with respect to said holding means, said fulcrum being disposed between said first end portion of said arm and a second end portion thereof to swing said arm to engage at said second end portion thereof with said stationary part of said frame on said insertion position so as to move said bias magnetic field applying means away from said recording medium.

6. An apparatus according to claim 5, wherein said arm means is made of a bent punched plate.

7. An apparatus according to claim 1, wherein said bias magnetic field applying means includes magnetic coil means.

8. An apparatus according to claim 1, wherein said cartridge holder is provided with an access port portion into which said means for applying is to be positioned to be close said recording medium, and said means for applying includes a periphery portion having a dimension larger than that of said access port portion, thereby restricting the movement of said means for applying toward said recording medium to maintain a distance between said recording medium and said means for applying when said recording medium is in the loading position.

9. An apparatus according to claim 1, wherein said apparatus further comprises a frame including a stationary part, and wherein said load motor drives said cartridge holder into said insertion/ejection position to make it close to said stationary part and into said loading position to make it apart from said stationary part, and wherein said driving means cooperates with said stationary part to restrict the movement of said means for applying close to said recording medium on said insertion/ejection position and disengages with said stationary part to allow the movement of said means for applying close to said recording medium when said recording medium is in the loading position.

10. An apparatus according to claim 9, wherein said means for driving further includes an elastic member which urges said means for applying towards said recording medium.

11. An apparatus according to claim 9, wherein said means for driving includes an arm, a first end portion of which swingably carries said means for applying and a fulcrum stationary with respect to said cartridge holder, said fulcrum being disposed between said first portion of said arm and a second end portion thereof to swing said arm to engage at said the second end portion thereof with said stationary part of said frame at said insertion/ejection position so as to move said means for applying away from said recording medium.

12. An apparatus according to claim 11, wherein said arm comprises a bent punched plate.

13. A magneto-optical recording/reproducing apparatus comprising:
    a cartridge containing a magneto-optical recording medium;

an optical head system applying an optical beam on said recording medium;

means for applying a bias magnetic field on said recording medium, said means for applying being so disposed as to interpose said recording medium between said optical head system and said magnetic field applying means;

a cartridge holder, holding therein said cartridge;

a loading motor for reciprocating said cartridge holder between a cartridge insertion/ejection position and a loading position in which a recording operation, a reproducing operation and an erasing operation are carried out;

means for driving said means for applying a bais magnetic field by using movement of said cartridge holder as driving power so that said means for applying is moved to be close to said recording medium when it is to be in the loading position and to be away from said recording medium when it is to be in the insertion/ejection position in opposite directions perpendicular to a plane of a face of said recording medium, said means for driving being disposed on said cartridge holder.

14. An apparatus according to claim 13, wherein said means for applying includes magnetic coil means.

* * * * *

UNITED STATES PATENT AND TRADEMARK OFFICE
CERTIFICATE OF CORRECTION

PATENT NO. : 5,060,207
DATED : October 22, 1991
INVENTOR(S) : Tokuya Kaneda, et al.

It is certified that error appears in the above-identified patent and that said Letters Patent is hereby corrected as shown below:

| Column | Line | |
|---|---|---|
| 1 | 50 | After "apparatus" insert --is--. |
| 1 | 52 | Change "envelopping" to --enveloping--. |
| 3 | 38 | Before "guide pins" delete "a". |
| 3 | 39 | Before "arc guide" delete "an". |
| 3 | 65 | Change "a" to --an--. |
| 4 | 7 | Change "cording" to --cordingly--. |
| 4 | 16 | Change "over" to --cover--. |
| 4 | 45 | Change "ing" to --ingly--. |
| 6 | 28 | After "close" insert --to--. |

Signed and Sealed this

Twenty-third Day of March, 1993

Attest:

STEPHEN G. KUNIN

Attesting Officer

Acting Commissioner of Patents and Trademarks